United States Patent
Thomas et al.

(10) Patent No.: US 10,421,494 B2
(45) Date of Patent: Sep. 24, 2019

(54) DEFLECTOR RAIL FOR FRAME RAIL

(71) Applicant: GM Global Technology Operations LLC, Detroit, MI (US)

(72) Inventors: Scott D. Thomas, Novi, MI (US); Andre T. Matsumoto, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 70 days.

(21) Appl. No.: 15/689,563

(22) Filed: Aug. 29, 2017

(65) Prior Publication Data

US 2019/0061822 A1 Feb. 28, 2019

(51) Int. Cl.
*B62D 21/15* (2006.01)
*B62D 25/08* (2006.01)
*B62D 27/00* (2006.01)

(52) U.S. Cl.
CPC ......... *B62D 21/152* (2013.01); *B62D 25/082* (2013.01); *B62D 27/00* (2013.01)

(58) Field of Classification Search
CPC ..... B62D 27/00; B62D 21/152; B62D 25/082

USPC ....................................................... 296/187.1
See application file for complete search history.

(56) References Cited

U.S. PATENT DOCUMENTS

| | | | |
|---|---|---|---|
| 8,398,154 B1 * | 3/2013 | Nusier ................ | B62D 21/152 280/784 |
| 8,746,764 B2 * | 6/2014 | Parkila .................. | B60R 19/24 293/133 |

* cited by examiner

*Primary Examiner* — Joseph D. Pape
*Assistant Examiner* — Dana D Ivey
(74) *Attorney, Agent, or Firm* — Quinn IP Law

(57) ABSTRACT

A support structure for a vehicle includes a first longitudinal node and a second longitudinal node. The second longitudinal node is disposed rearward of the first longitudinal node along a central longitudinal axis of the vehicle. The first longitudinal node is disposed inboard of the second longitudinal node relative to the central longitudinal axis. A deflector rail is positioned adjacent to the support structure, between the first longitudinal node and the second longitudinal node. The deflector rail is operable to increase a stiffness of the support structure in response to a load applied to a front of the vehicle offset from the central longitudinal axis, and not increase the stiffness of the support structure in response to a load applied to the front of the vehicle that includes the central longitudinal axis.

20 Claims, 6 Drawing Sheets

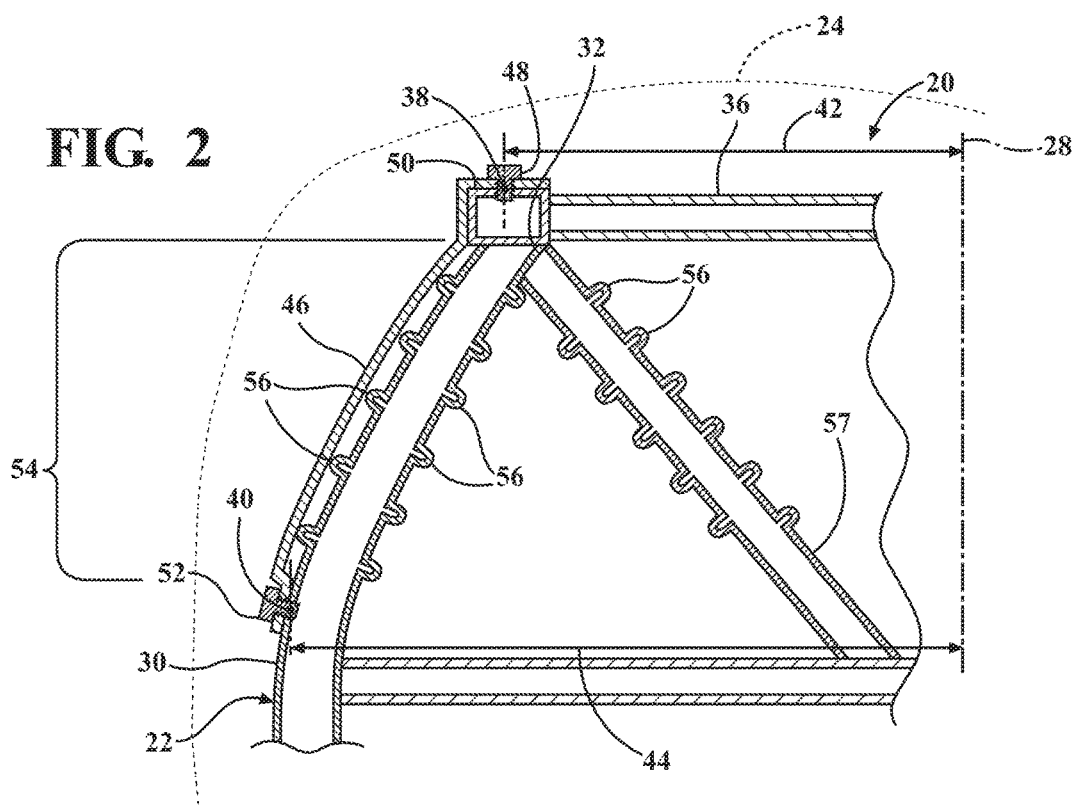
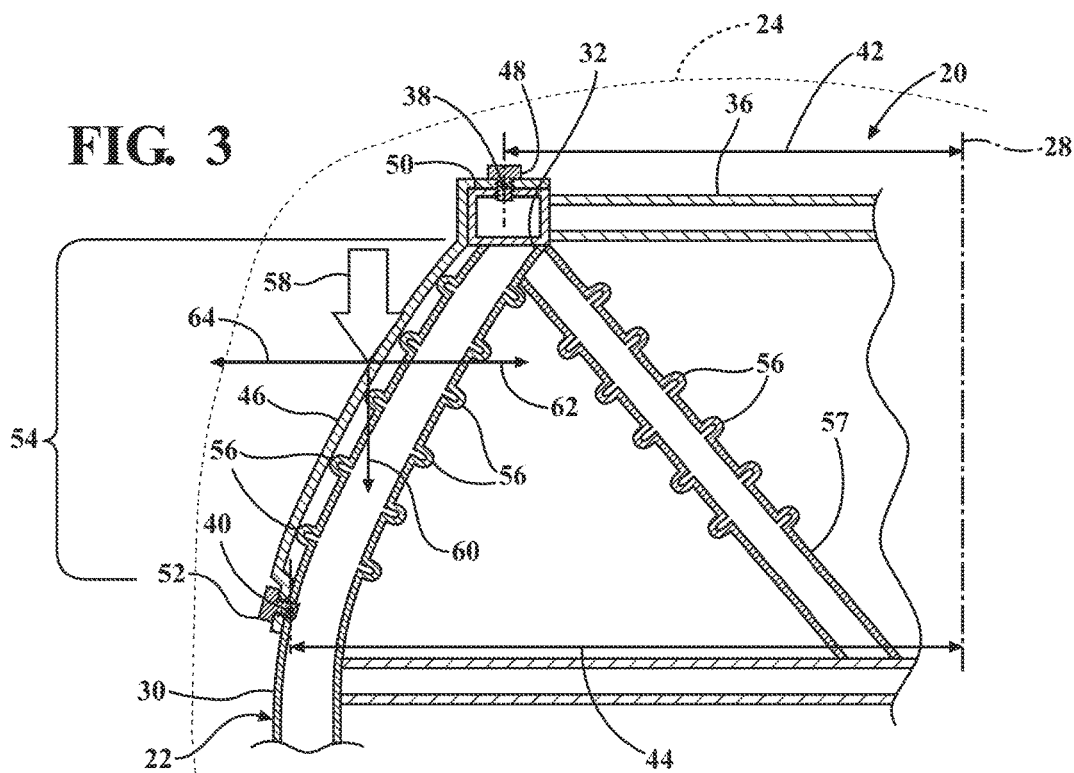

DEFLECTOR RAIL FOR FRAME RAIL

The disclosure generally relates to a support structure of a vehicle.

Vehicles include some form of a body support structure, which often includes at least one pair of laterally offset frame rails that extend forward from a bulkhead. A bumper structure, radiator tie bar or other lateral structure, including a load bearing beam, may be attached to a forward end of the frame rails. In the event of a distributed centralized frontal applied load, in which a load is applied uniformly to a front end of the vehicle, the applied load may be transmitted or transferred to the frame rails, which may crumple or crush in response to the applied load in order to absorb energy. However, in the event of an offset frontal applied load, in which a load is applied to a forward corner of the vehicle, the applied load may be transmitted or transferred to the adjacent frame rail. In response to the offset frontal applied load, it may be desirable for the frame rail to have sufficient stiffness to not significantly crush or crumple, so that the frame rail may guide the vehicle laterally away from applied load.

SUMMARY

A vehicle is provided. The vehicle includes a frame rail. The frame rail includes a first longitudinal node and a second longitudinal node. The second longitudinal node is disposed rearward of the first longitudinal node along a central longitudinal axis of the vehicle. The first longitudinal node of the frame rail is laterally offset from the central longitudinal axis a first distance. The second longitudinal node of the frame rail is laterally offset from the central longitudinal axis a second distance. The second distance is greater than the first distance, such that the first longitudinal node is inboard of the second longitudinal node relative to the central longitudinal axis. A deflector rail is positioned adjacent to the frame rail, between the first longitudinal node of the frame rail and the second longitudinal node of the frame rail. The deflector rail is operable to increase a stiffness of the frame rail in response to a load applied to a front of the frame rail and laterally offset from the central longitudinal axis.

In one aspect of the vehicle, a forward connection interconnects the deflector rail and the frame rail at the first longitudinal node. In one embodiment of the vehicle, the forward connection connects the deflector rail to a forward facing surface of the frame rail.

In one aspect of the vehicle, a rearward connection interconnects the deflector rail and the frame rail at the second longitudinal node. In one embodiment, the rearward connection is a frangible connection operable to fracture in response to a predefined applied force. In another aspect of the vehicle, the deflector rail is characterized by the lack of a connection between the deflector rail and frame rail at the second longitudinal node, i.e., no rearward connection.

In one embodiment of the vehicle, the frame rail includes a deformation zone disposed between the first longitudinal node and the second longitudinal node. The deformation zone includes at least one deformation initiator. The deflector rail extends rearward of the deformation zone along the central longitudinal axis.

In one aspect of the vehicle, the deflector rail and the frame rail each include complimentary cross sectional shapes. One of the deflector rail and the frame rail is at least partially nested within the other of the deflector rail and the frame rail. In one embodiment of the vehicle, the deflector rail includes a cross section defining a concave feature, with the frame rail at least partially nested within the concave feature of the deflector rail.

In one embodiment of the vehicle, the deflector rail includes at least one rib extending axially along the central longitudinal axis.

In one aspect of the vehicle, the deflector rail is disposed outboard of the frame rail, relative to the central longitudinal axis. In another aspect of the vehicle, the vehicle includes a body panel attached to the frame rail. The deflector rail is disposed between the body panel and the frame rail.

In one embodiment of the vehicle, the deflector rail includes a curvilinear shape, such as an "S" shape, between the first longitudinal node and the second longitudinal node. The curvilinear shape is apparent when viewed from above relative to a horizontal plane defined by the central longitudinal axis and a central transverse axis of the vehicle.

In one embodiment of the vehicle, the deflector rail includes a frangible connection for connecting a component, such as but not limited to a body panel or a window track, thereto. In another embodiment, the deflector rail includes an opening, and the frame rail includes a frangible bracket positioned adjacent the opening for mounting the component to the frangible bracket through the opening.

A support structure for a vehicle is also provided. The support structure includes a frame rail extending between a front end and a rear end along a central longitudinal axis. The frame rail includes a first longitudinal node and a second longitudinal node. The second longitudinal node disposed rearward of the first longitudinal node along the central longitudinal axis. The first longitudinal node is laterally offset from the central longitudinal axis a first distance, and the second longitudinal node is laterally offset from the central longitudinal axis a second distance. The second distance is greater than the first distance, such that the first longitudinal node is inboard of the second longitudinal node relative to the central longitudinal axis. A deflector rail is positioned adjacent to and outboard of the frame rail, between the first longitudinal node and the second longitudinal node. A forward connection interconnects the deflector rail and the support structure at the first longitudinal node. A rearward connection interconnects the deflector rail and the support structure at the second longitudinal node. The rearward connection is frangible and operable to fracture in response to a predefined applied force. The forward connection may securely fasten the deflector rail to the frame rail so that the deflector rail stiffens the frame rail against an applied load applied to a front of the support structure and laterally offset from the central longitudinal axis. Alternatively, the forward connection may be frangible to allow the deflector rail to move for/aft with the applied load. The rearward connection may fracture so that the deflector rail does not stiffen the frame rail against an applied load applied to the front of the support structure that is not laterally offset from the central longitudinal axis.

In one embodiment of the support structure, the forward connection connects the deflector rail to a forward facing surface of the frame rail.

In one embodiment of the support structure, the deflector rail and the frame rail each include complimentary cross sectional shapes. One of the deflector rail and the frame rail at least partially nests within the other of the deflector rail and the frame rail.

In one embodiment of the support structure, the deflector rail includes at least one rib extending axially along the central longitudinal axis.

In one embodiment of the support structure, the deflector rail includes a curvilinear shape between the first longitudinal node and the second longitudinal node. The curvilinear shape of the deflector rail is operable to guide the frame rail laterally away from an object contacting a front corner of the support structure.

Accordingly, the deflector rail is operable to stiffen the frame rail of the support structure in response to an offset applied load, so that the frame rail has sufficient stiffness to guide the vehicle away from the offset applied load. In response to a distributed centralized frontal applied load, the deflector rail does not significantly stiffen the frame rail, thereby allowing the frame rail to deform and absorb energy. The approach taken has a minimal effect on frame rail deformation when a distributed centralized frontal load is applied. In order to do so, in response to the distributed centralized frontal applied load, the rearward connection, if so equipped, is frangible, so that it may fracture, thereby allowing the deflector rail to decouple at least one end from the frame rail so that the frame rail may deform.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 2 is a fragmentary schematic cross sectional plan view of the vehicle.

FIG. 3 is a fragmentary schematic cross sectional plan view of the vehicle deformed in response to an offset applied frontal load.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Referring to the Figures, wherein like numerals indicate like parts throughout the several views, a vehicle is generally shown at 20. The vehicle 20 may include a shape, size, and/or style of a moveable platform, such as but not limited to a coupe, a sedan, a sport utility vehicle, a truck, a van, atv, utv, etc.

Figure 1:
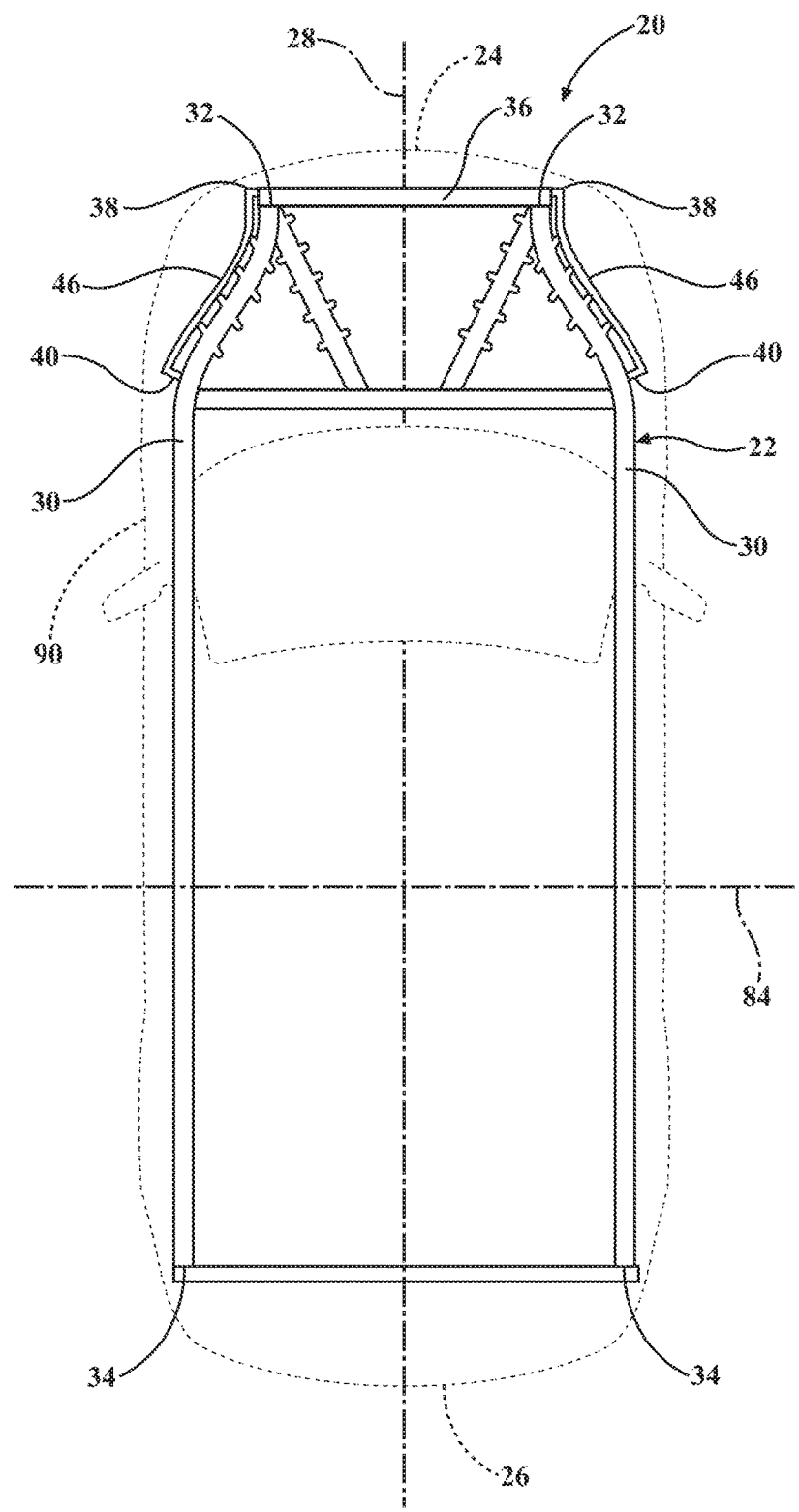
FIG. 1 is a schematic plan view of a vehicle.

Referring to FIG. 1, the vehicle 20 includes a support structure 22. The support structure 22 supports the various components of the vehicle 20, such as but not limited to the drivetrain, wheels, axles, body panels, etc. The support structure 22 may extend between a forward end 24 and a rearward end 26 of the vehicle 20. The rearward end 26 is spaced from the forward end 24 along a central longitudinal axis 28. The central longitudinal axis 28 extends along a longitudinal center line of the vehicle 20.

The support structure 22 includes at least one frame rail 30. The frame rail 30 extends between a front end 32 and a rear end 34 along the central longitudinal axis 28. The front end 32 of the frame rail 30 is disposed at the forward end 24 of the vehicle 20. While one frame rail 30 is specifically described in detail herein, it should be appreciated that the support structure 22 is generally symmetrical across the central longitudinal axis 28. As such, the support structure 22 includes two frame rails 30 laterally offset on each side of the central longitudinal axis 28 from each other. It should be appreciated that the description of the support structure 22, including the frame rail 30, is applicable to either side of the support structure 22 relative to the central longitudinal axis 28. The support structure 22 also may have more than one frame rail 30 per side at different heights, and the teachings of this disclosure may apply to more than one frame rail 30 per side. In addition, the support structure 22, including the frame rails 30, may be integral to the body outer panels, such as a formed shape in a body outer panel stamping/layup, or may be separate from it.

A beam 36 may be attached to the front end 32 of the frame rail 30. The beam 36 is disposed transverse to the central longitudinal axis 28. The beam 36 may be attached to the frame rail 30 in a suitable manner, such as but not limited to a bolted, bonded, or welded connection therebetween. The beam 36 operates to transmit loads applied in an axial direction along the central longitudinal axis 28 to the frame rail 30. The beam 36 may be part of a bumper system, a radiator support, a hood latch support, or may be separate from these.

Referring to FIG. 2, the frame rail 30 includes a first longitudinal node 38 and a second longitudinal node 40 disposed along the central longitudinal axis 28. The first longitudinal node 38 may be disposed at or adjacent the front end 32 of the frame rail 30. In other embodiments, the first longitudinal node 38 is disposed rearward of the front end 32 of the frame rail 30, yet forward of a passenger compartment bulkhead of the vehicle 20. The second longitudinal node 40 is disposed rearward of the first longitudinal node 38 along the central longitudinal axis 28.

The first longitudinal node 38 is laterally offset from the central longitudinal axis 28 a first distance 42. The second longitudinal node 40 of the support structure 22 is laterally offset from the central longitudinal axis 28 a second distance 44. The second distance 44 is greater than the first distance 42 such that the first longitudinal node 38 is inboard of the second longitudinal node 40 relative to the central longitudinal axis 28, and the second longitudinal node 40 is outboard of the first longitudinal node 38 relative to the central longitudinal axis 28. As used herein, the term "outboard" refers to a location relative to a center of the vehicle 20 along the central longitudinal axis 28 that is located further away from an "inboard" location. As such, an inboard location is disposed nearer the center of the vehicle 20 relative to an outboard location, which is disposed farther from the center of the vehicle 20.

Referring to FIG. 2, a deflector rail 46 is positioned adjacent to the frame rail 30 of the support structure 22. The deflector rail 46 is positioned along the central longitudinal axis 28 between the first longitudinal node 38 of the frame rail 30 and the second longitudinal node 40 of the frame rail 30. The deflector rail 46 is disposed outboard of the frame rail 30, relative to the central longitudinal axis 28. The deflector rail 46 may include and be manufactured from a rigid, deformation resistant material, including but not limited to metals, aluminum, steel, fiber reinforced polymers, etc.

A forward connection 48 interconnects the deflector rail 46 and the support structure 22 at or near the first longitudinal node 38. The forward connection 48 may include, but is not limited to a mechanical connection with a fastener, a welded connection, or a bonded connection with an adhesive. In some embodiments, the forward connection 48 may include a strong connection that will maintain the connection between the deflector rail 46 and the support structure 22 in response to a significant applied load. In other embodiments, the forward connection 48 may be a weak connection that allows the deflector rail 46 to separate from the support structure 22, possibly bending locally, and slide along or relative to the support structure 22. In one embodiment, the forward connection 48 connects the deflector rail 46 to a forward facing surface 50 of the support structure 22, such as but not limited to a forward facing surface 50 of the beam 36, so that the forward connection 48 is less subject to shear forces in response to a load applied to the forward end 24 of the vehicle 20. In other embodiments, the forward connection 48 may be made to a side of the frame rail 30, or to beam 36.

A rearward connection 52 may interconnect the deflector rail 46 and the support structure 22 at or near the second longitudinal node 40. When equipped with the rearward connection 52, the rearward connection 52 is a connection 86 operable to fracture in response to a predefined applied force. In one embodiment, the connection 86 may be designed to be strong enough to remain attached during normal and extreme driving conditions, but may become detached with the application of a significant force to the front of the deflector rail 46. The rearward connection 52 may include, but is not limited to a mechanical connection with a fastener, a welded connection, or a bonded connection with an adhesive. The rearward connection 52 is preferably a weak connection that fractures or breaks in response to a pre-defined applied force. In some embodiments, the rearward connection 52 connects the deflector rail 46 and the frame rail 30 of the support structure 22. In other embodiments, the vehicle 20 does not include the rearward connection 52, i.e., the vehicle 20 lacks a connection between the deflector rail 46 and support structure 22 at the second longitudinal node 40. Further, the rearward connection 52 does not need to be located at the rear of the deflector rail 46, and may be located near a midpoint of the deflector rail 46, or aft of that.

Referring to FIG. 2, the support structure 22 may include a deformation zone 54 disposed between the first longitudinal node 38 and the second longitudinal node 40. The deformation zone 54 includes at least one deformation initiator 56. In the exemplary embodiment shown in the figures, the deformation zone 54 includes a plurality of deformation initiators 56. The deformation initiators 56 are designed to facilitate the deformation of the frame rail 30 in response to an applied load directed axially along the central longitudinal axis 28. The specific configuration and operation of the deformation initiators 56 are not pertinent to the teachings of this disclosure, and are therefore not described in detail herein. In some embodiments, the support structure 22 may optionally have an inboard angled member 57, which may have one or more deformation initiators 56 These deformation initiators 56 may fall within the deformation zone 54 or extend beyond it. In some embodiments, the deflector rail 46 may extend forward of the deformation zone 54 and rearward of the deformation zone 54, along the central longitudinal axis 28.

The deflector rail 46 is operable to increase a stiffness of the support structure 22, e.g., the frame rail 30, in response to an offset load 58 applied to the forward portion of the vehicle 20. As used herein, the term "offset load" may be considered a load that is applied to a location of the support structure 22 that is laterally offset from the central longitudinal axis 28. An applied load may be considered an offset load when it is applied to an outboard 25% (left or right) of the forward end 24 of the vehicle 20, i.e., the leftmost 25% or the forward end 24 of the vehicle 20, or the rightmost 25% of the forward end 24 of the vehicle 20. Furthermore, the deflector rail 46 does not significantly affect the stiffness of the support structure 22, e.g., the frame rail 30, in response to a non-offset distributed load applied to the forward end 24 of the vehicle 20. As used herein, the term "non-offset load" may be considered a distributed load that is applied to a location of the support structure 22 that includes the central longitudinal axis 28. An applied load may be considered a non-offset load when it includes a central 50% of the forward end 24 of the vehicle 20.

The forward connection 48 securely fastens the deflector rail 46 to the frame rail 30 so that the deflector rail 46 stiffens the support structure 22 in response to an offset load 58 applied to the forward end 24 of the vehicle 20 and laterally offset from the central longitudinal axis 28. The rearward connection 52 may fracture (or the vehicle 20 may not be equipped with the rearward connection 52) so that the deflector rail 46 does not stiffen the frame rail 30 against a non-offset load applied to the forward end 24 of the vehicle 20 that includes the central longitudinal axis 28.

Referring to FIG. 3, a reaction of the support structure 22 to an offset load 58 is shown. The offset load 58 is applied to the deflector rail 46. The offset load 58 imparts a longitudinal force component 60 and a transverse component 62 to the deflector rail 46, which is disposed between the offset load 58 and the frame rail 30. In response to the offset load 58, the deflector rail 46 structurally supports the frame rail 30, thereby stiffening the frame rail 30. Additionally, due to the inboard angle or orientation of the frame rail 30 and the deflector rail 46, the deflector rail 46 generates a reactionary force 64 which urges the vehicle 20 laterally away from the offset load 58.

Figure 4:
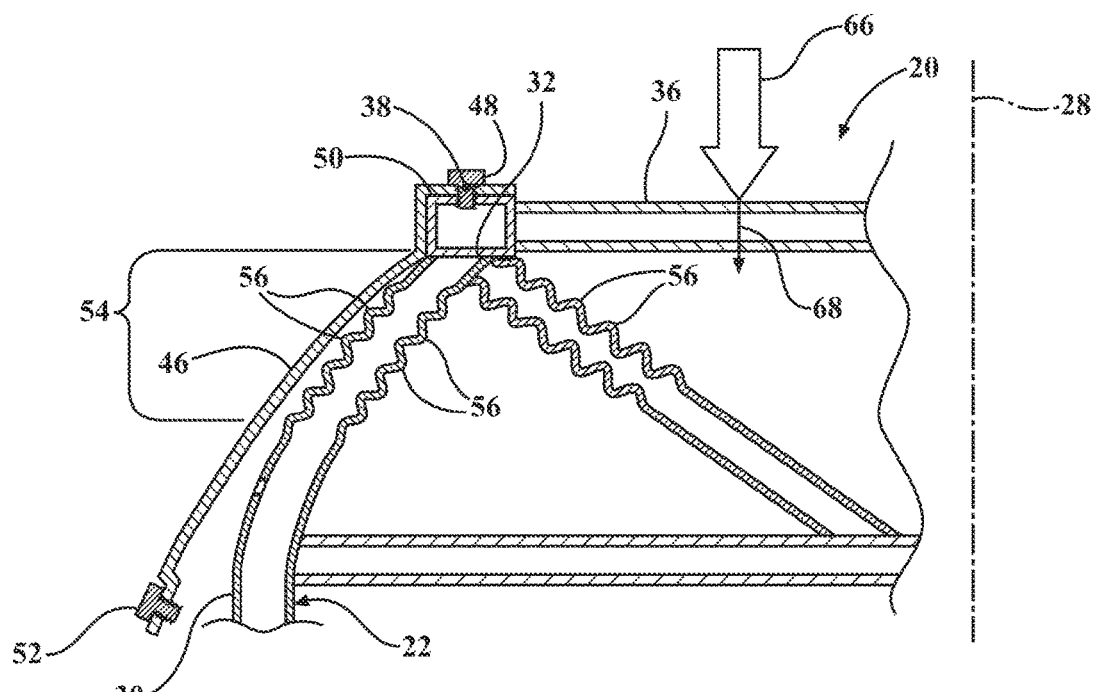
FIG. 4 is a fragmentary schematic cross sectional plan view of the vehicle deformed in response to a centralized applied frontal load.

Referring to FIG. 4, a reaction of the support structure 22 to a non-offset load 66 is shown. The non-offset load 66 is applied to the beam 36, in a direction axially along central longitudinal axis 28. The non-offset load 66 imparts a longitudinal force component 68 to the beam 36, which in turn transfers the longitudinal force component 68 to the frame rail 30. The deformation initiators 56 deform in response to the longitudinal force component 68 to absorb energy. In response to the non-offset load 66, the rearward connection 52 of the deflector rail 46 fractures, allowing the deflector rail 46 to move relative to the frame rail 30 so that the deflector rail 46 does not interfere with the operation of the deformation initiators 56 and the beam 36 deformation which they control.

The deflector rail 46 may include a shape and/or configuration that is operable to stiffen the frame rail 30 in response to the offset load, while not significantly affecting the stiffness of the frame rail 30 in response to the non-offset load. Exemplary embodiments of the deflector rail 46 are described below with reference to the appropriate Figures. It should be appreciated that the deflector rail 46 may include one or more of the different embodiments described below and shown in the different figures.

Figure 5:
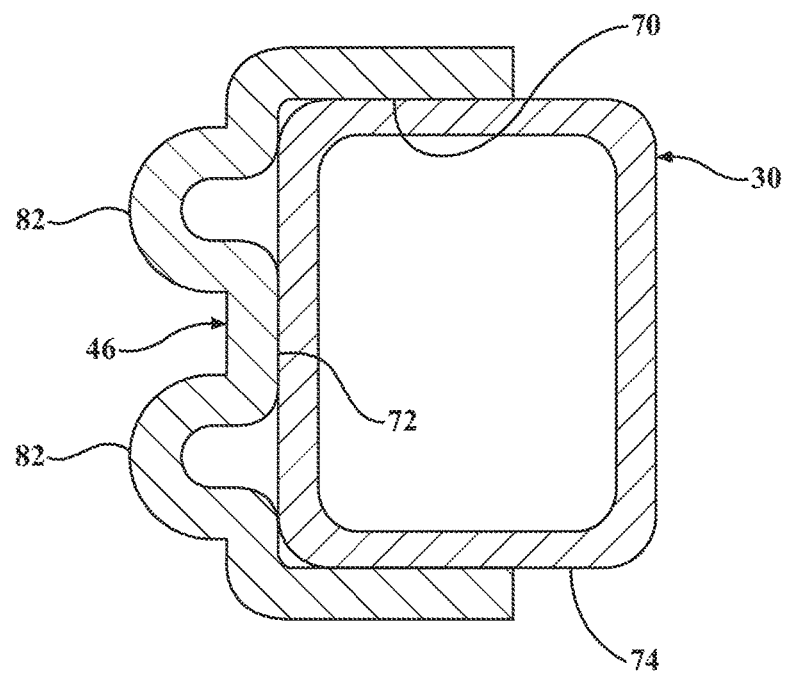
FIG. 5 is a fragmentary cross sectional view of a deflector rail attached to a frame rail of the vehicle.
Figure 6:
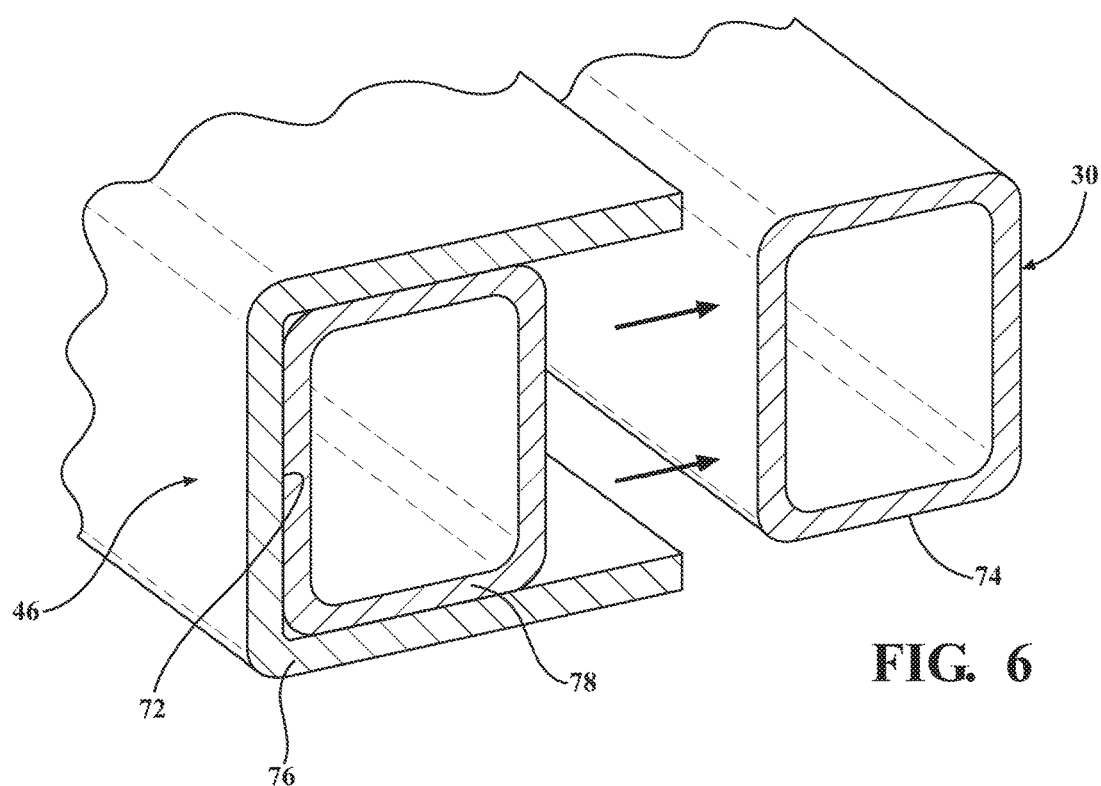
FIG. 6 is a fragmentary perspective cross sectional view of a first alternative embodiment of the deflector rail and the frame rail.

The deflector rail 46 and the support structure 22, e.g., the frame rail 30, may each include complimentary cross sectional shapes, with one of the deflector rail 46 and the support structure 22 at least partially nested within the other of the deflector rail 46 and the support structure 22. For example, as shown in FIGS. 5 and 6, the deflector rail 46 may include a cross section defining a concave feature, with the support structure 22, e.g., the frame rail 30, at least partially nested within the concave feature of the deflector rail 46. In other embodiments, such as shown in FIG. 7, the support structure 22 may include a cross section defining the concave feature, with the deflector rail 46 at least partially nested within the concave feature.

For example, referring to FIG. 5, the deflector rail 46 generally has a cross sectional shape forming a channel 72. The frame rail 30 is generally shown having a cross sectional shape forming a rectangle 74 having outer dimensions approximately equal to the dimensions of the channel 72 formed by the deflector rail 46. The frame rail 30 is nested within the channel 72 of the deflector rail 46.

Referring to FIG. 6, the deflector rail 46 is formed from a composite manufacture, including a channel member 76 and a tubular member 78. The channel member 76 includes a cross sectional shape forming a channel 72, with the tubular member 78 disposed within the channel 72. The channel member 76 and the tubular member 78 may be fastened together to form a single unit of manufacture. In other embodiments, the tubular member 78 may be attached to an exterior side of the channel member 76. The frame rail 30 is generally shown having a cross sectional shape forming a rectangle 74 having outer dimensions approximately equal to the dimensions of the channel 72 formed by the channel member 76. The frame rail 30 is nested within the channel 72 of the channel member 76.

Figure 7:
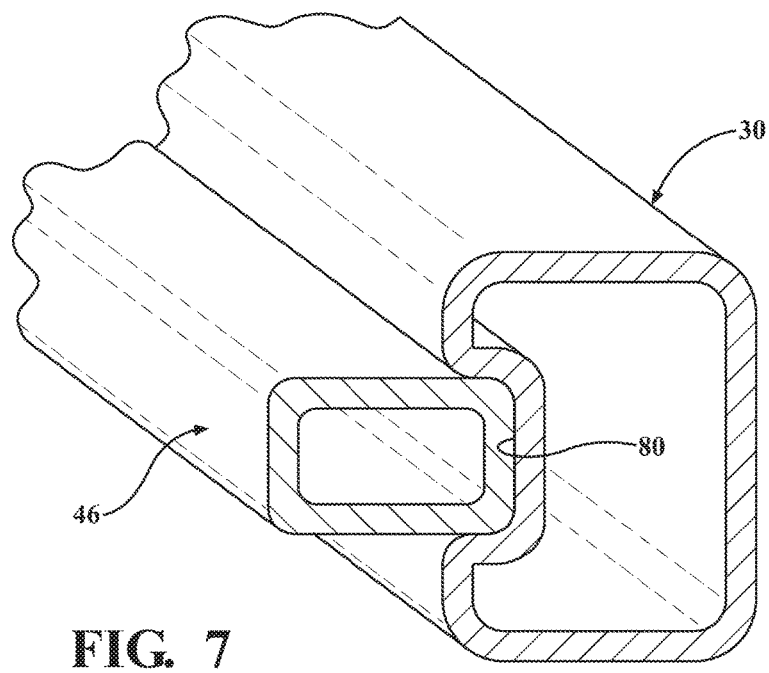
FIG. 7 is a fragmentary perspective cross sectional view of a second alternative embodiment of the deflector rail and the frame rail.

Referring to FIG. 7, the cross sectional shape of the frame rail 30 is shown having a generally rectangular recess 80. The deflector rail 46 is shown having a generally rectangular cross sectional shape having outer dimensions approximately equal to the dimensions of the rectangular recess 80. The deflector rail 46 is nested within the recess 80 of the frame rail 30.

Referring to FIG. 5, the deflector rail 46 may include one or more ribs 82 that extend axially along the central longitudinal axis 28. The ribs 82 provide a geometric stiffening feature to the deflector rail 46. While the exemplary embodiment of the deflector rail 46 shown in FIG. 5 includes two ribs 82, it should be appreciated that the deflector rail 46 may include one rib 82, or more than the two ribs 82 shown. In some embodiments, the ribs 82 may extend the entire length of the deflector rail 46, between the first longitudinal node 38 and the second longitudinal node 40. In other embodiments, the ribs 82 may partially extend between the first longitudinal node 38 and the second longitudinal allocation.

Referring to FIG. 1, the deflector rail 46 may include a curvilinear shape between the first longitudinal node 38 and the second longitudinal node 40. The curvilinear shape may be defined as a generally "S" shaped configuration when viewed on a horizontal plane defined by the central longitudinal axis 28 and a central transverse axis 84 of the vehicle 20. The curvilinear shape transitions a portion of the longitudinal force component 60 of the applied offset load 58 to the transverse force component 62 of the applied offset load 58 to move or push the vehicle 20 laterally away from a source of the applied offset load 58.

One of the deflector rail 46 or the frame rail 30 may include a connection 86 (shown in FIG. 8) or a bracket 88 (shown in FIG. 9) for connecting a component thereto. The component may include a device, such as but not limited to a body panel or a window support. For example, referring to FIGS. 8 and 9, the vehicle 20 is shown with a body panel 90. The deflector rail 46 is disposed between the body panel 90 and the support structure 22, e.g., the frame rail 30.

Figure 8:
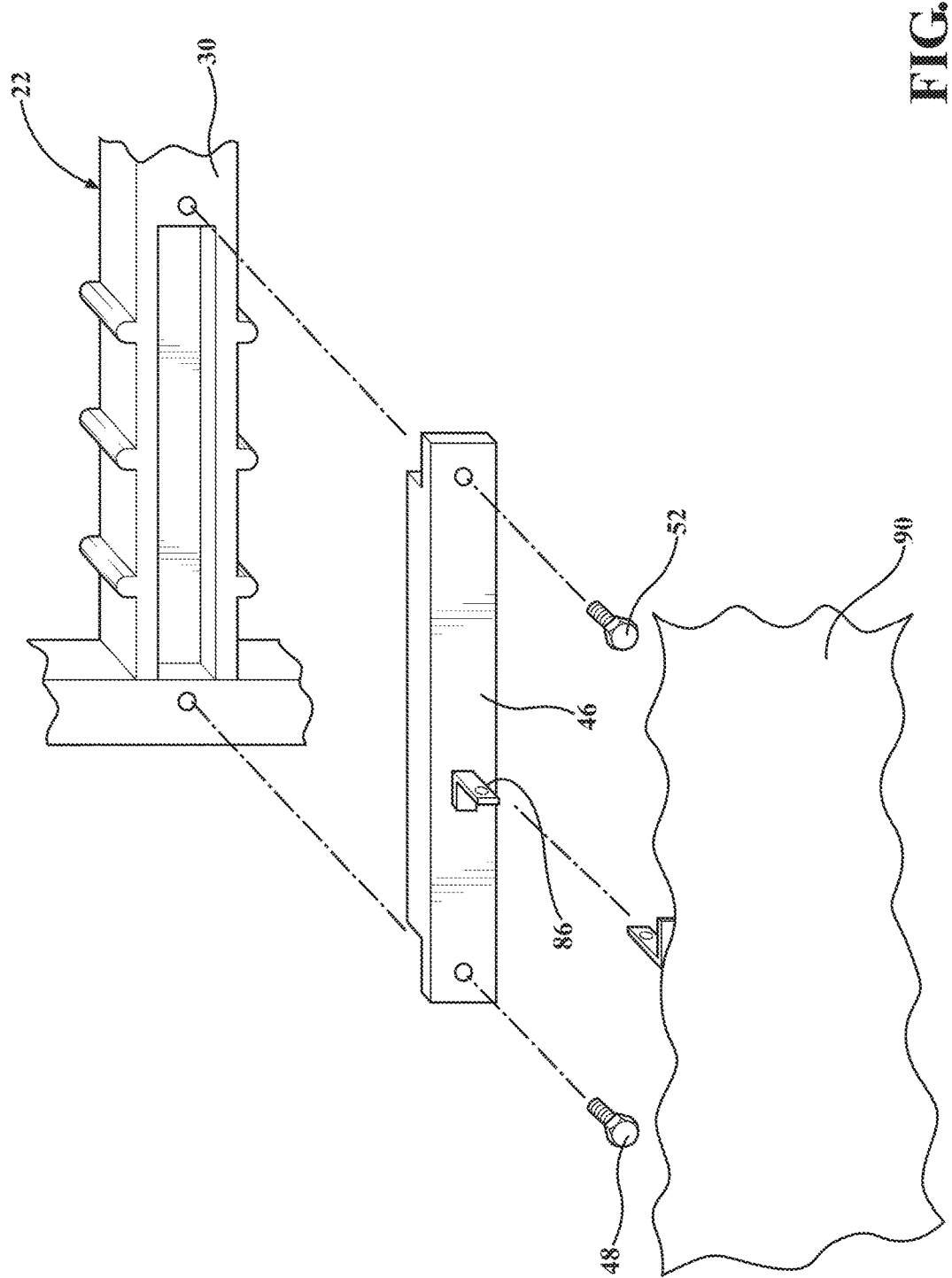
FIG. 8 is a fragmentary exploded perspective view of a third alternative embodiment of the deflector rail.

Referring to FIG. 8, the deflector rail 46 includes a connection 86 interconnecting the body panel 90 and the deflector rail 46, in order to support the body panel 90 relative to the support structure 22. The connection 86 may be designed to be operable to fracture in response to a pre-defined or engineered force so that the connection does not interfere with the operation of the deflector rail 46 described above.

Figure 9:
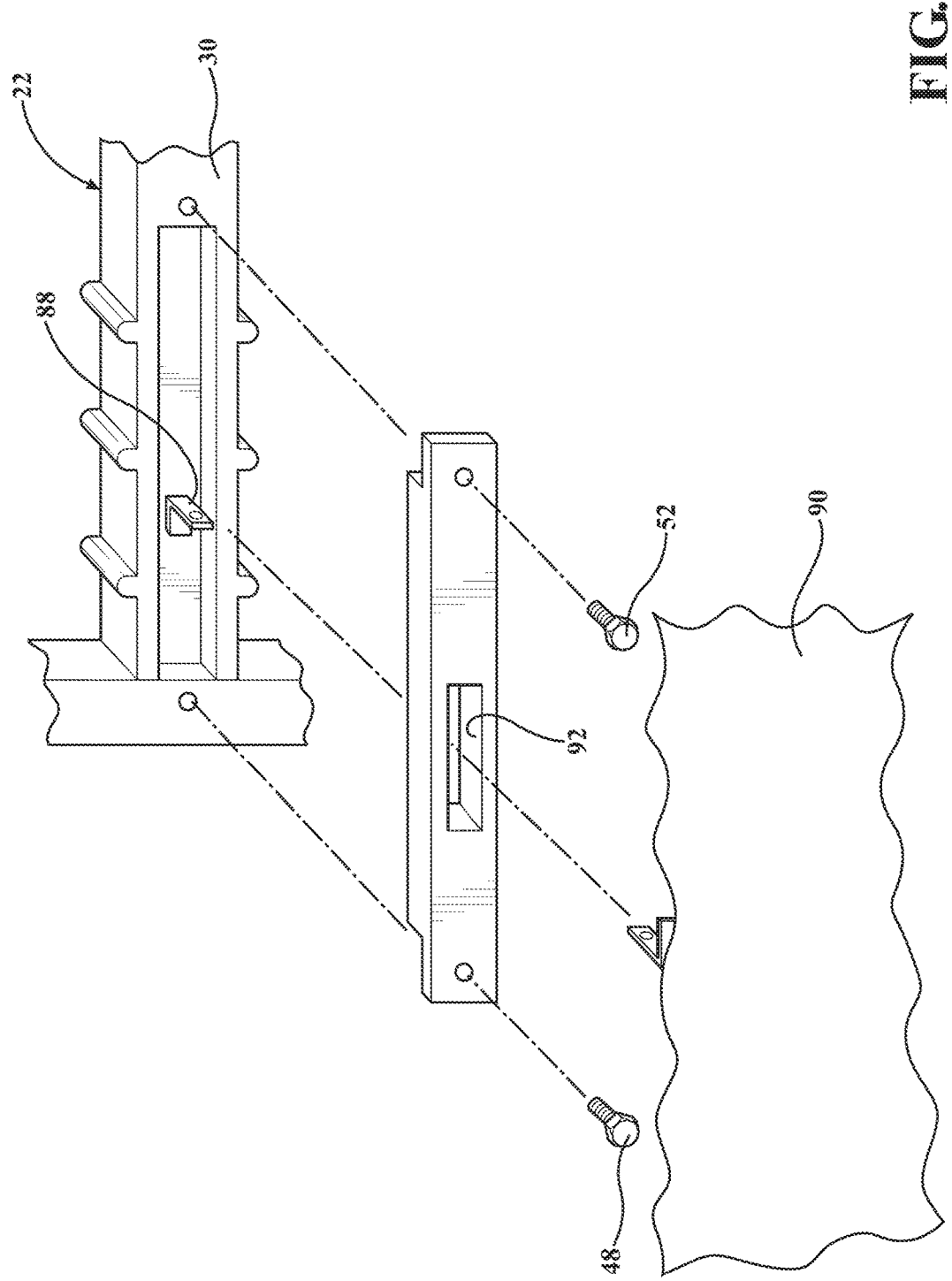
FIG. 9 is a fragmentary exploded perspective view of a fourth alternative embodiment of the deflector rail.

Referring to FIG. 9, the deflector rail 46 includes an opening 92, and the support structure 22, e.g., the frame rail 30, includes a bracket 88 positioned adjacent the opening 92. The bracket 88 mounts the body panel 90 to the frame rail 30 through the opening 92 in the deflector rail 46. The bracket 88 may be designed to be operable to fracture in response to a pre-defined or engineered force so that the connection does not interfere with the operation of the deflector rail 46 described above.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A vehicle comprising:
   a frame rail extending along a central longitudinal axis between a forward end and a rearward end, and including a first longitudinal node and a second longitudinal node, with the second longitudinal node disposed rearward of the first longitudinal node along the central longitudinal axis;
   wherein the first longitudinal node of the frame rail is laterally offset from the central longitudinal axis a first distance, and the second longitudinal node of the frame rail is laterally offset from the central longitudinal axis a second distance, with the second distance being greater than the first distance such that the first longitudinal node is inboard of the second longitudinal node relative to the central longitudinal axis; and
   a deflector rail positioned adjacent to the frame rail, between the first longitudinal node of the frame rail and the second longitudinal node of the frame rail, wherein the deflector rail is operable to increase a stiffness of the frame rail in response to a load applied to a front of the frame rail and laterally offset from the central longitudinal axis.

2. The vehicle set forth in claim 1, further comprising a forward connection interconnecting the deflector rail and the frame rail at the first longitudinal node.

3. The vehicle set forth in claim 2, wherein the forward connection connects the deflector rail to a forward facing surface of the frame rail.

4. The vehicle set forth in claim 2, further comprising a rearward connection interconnecting the deflector rail and the frame rail at the second longitudinal node.

5. The vehicle set forth in claim 4, wherein the rearward connection is a frangible connection operable to fracture in response to a predefined applied force.

6. The vehicle set forth in claim 2, characterized by the lack of a connection between the deflector rail and frame rail at the second longitudinal node.

7. The vehicle set forth in claim 1, wherein the frame rail includes a deformation zone disposed between the first longitudinal node and the second longitudinal node, and having at least one deformation initiator, with the deflector rail extending rearward of the deformation zone along the central longitudinal axis.

8. The vehicle set forth in claim 1, wherein the deflector rail and the frame rail each include complimentary cross sectional shapes, with one of the deflector rail and the frame rail at least partially nested within the other of the deflector rail and the frame rail.

9. The vehicle set forth in claim 1, wherein the deflector rail includes at least one rib extending axially along the central longitudinal axis.

10. The vehicle set forth in claim 1, wherein the deflector rail is disposed outboard of the frame rail, relative to the central longitudinal axis.

11. The vehicle set forth in claim 1, wherein the deflector rail includes a cross section defining a concave feature, with the frame rail at least partially nested within the concave feature of the deflector rail.

12. The vehicle set forth in claim 1, wherein the deflector rail includes a curvilinear shape between the first longitudinal node and the second longitudinal node.

13. The vehicle set forth in claim 1, further comprising a body panel attached to the frame rail, with the deflector rail disposed between the body panel and the frame rail.

14. The vehicle set forth in claim 1, wherein the deflector rail includes a connection for connecting a component thereto.

15. The vehicle set forth in claim 1, wherein the deflector rail includes an opening, and the frame rail includes a bracket positioned adjacent the opening for mounting a component to the bracket through the opening.

16. A support structure for a vehicle, the support structure comprising:
- a frame rail extending between a front end and a rear end along a central longitudinal axis, the frame rail including a first longitudinal node and a second longitudinal node, with the second longitudinal node disposed rearward of the first longitudinal node along the central longitudinal axis;
- wherein the first longitudinal node is laterally offset from the central longitudinal axis a first distance, and the second longitudinal node is laterally offset from the central longitudinal axis a second distance, with the second distance being greater than the first distance such that the first longitudinal node is inboard of the second longitudinal node relative to the central longitudinal axis;
- a deflector rail positioned adjacent to and outboard of the frame rail, between the first longitudinal node and the second longitudinal node;
- a forward connection interconnecting the deflector rail and the support structure at the first longitudinal node;
- a rearward connection interconnecting the deflector rail and the support structure at the second longitudinal node, wherein the rearward connection is frangible and operable to fracture in response to a predefined applied force;
- wherein the forward connection securely fastens the deflector rail to the frame rail so that the deflector rail stiffens the support structure in response to a load applied to a front of the support structure and laterally offset from the central longitudinal axis, while the rearward connection may fracture so that the deflector rail does not stiffen the frame rail against an applied load applied to the front of the support structure that is not laterally offset from the central longitudinal axis.

17. The support structure set forth in claim 16, wherein the forward connection connects the deflector rail to a forward facing surface of the frame rail.

18. The support structure set forth in claim 16, wherein the deflector rail and the frame rail each include complimentary cross sectional shapes, with one of the deflector rail and the frame rail at least partially nested within the other of the deflector rail and the frame rail.

19. The support structure set forth in claim 16, wherein the deflector rail includes at least one rib extending axially along the central longitudinal axis.

20. The support structure set forth in claim 16, wherein the deflector rail includes a curvilinear shape between the first longitudinal node and the second longitudinal node to guide the frame rail laterally away from an object contacting a front corner of the support structure.

* * * * *